United States Patent [19]

Yant et al.

[11] Patent Number: 4,744,956

[45] Date of Patent: May 17, 1988

[54] CONTINUOUS REACTION OF GASES WITH LIQUIDS

[75] Inventors: Robert E. Yant, Medina; Philip A. Larson, Bay Village, both of Ohio

[73] Assignee: Quantum Technologies, Inc., Twinsburg, Ohio

[21] Appl. No.: 828,537

[22] Filed: Feb. 12, 1986

[51] Int. Cl.[4] ............... B01F 5/18; B01J 10/00; B05B 7/02

[52] U.S. Cl. .................. 422/106; 422/188; 422/224; 422/234; 261/76; 261/78 A; 261/78.2; 423/473

[58] Field of Search ............ 422/106, 111, 188, 224, 422/234, 242; 261/76, 115, DIG. 12, DIG. 54, DIG. 56, 78 A; 423/183, 474, 473; 415/53 T, 198.2, 213 T; 417/54, 68

[56] References Cited

U.S. PATENT DOCUMENTS

| | | | |
|---|---|---|---|
| 1,808,956 | 6/1931 | Ketterer . | |
| 2,020,850 | 11/1935 | Myhren et al. | 261/76 |
| 2,127,571 | 8/1938 | Pardee, Jr. | 23/154 |
| 2,606,150 | 5/1952 | Thorp | 210/31 |
| 2,889,199 | 6/1959 | Osborne et al. | 23/86 |
| 3,997,631 | 12/1976 | Matsuoka et al. | 261/37 |
| 4,260,335 | 4/1981 | Marchal | 417/68 |
| 4,479,756 | 10/1984 | Sieghartner | 415/53 T |

Primary Examiner—Barry S. Richman
Assistant Examiner—Jill Johnston
Attorney, Agent, or Firm—Arthur S. Collins

[57] ABSTRACT

A continuous system, process and associated apparatus are disclosed for reacting a gas with a liquid to manufacture a gaseous or liquid product. The preferred system comprises a reactive gas, such as chlorine and an aqueous solution, such as caustic soda, which are continuously combined and reacted under largely superatmospheric pressure and in turbulent cocurrent flow in very compact reactor equipment. Liquid bleach solutions such as aqueous solutions of hypochlorites or hypochlorous acid are among the products of major interest. The main reactor equipment consists of a fluid pressure energized, in-line mixing device followed by a low slip (closely fitted) regenerative turbine pumping unit. The fluid ports in the closely fitted stator elements of said pumping unit should have a radial dimension equal to at least about half that of the vanes. In a liquid ring compressor these ports are located adjacent the lower parts of said vanes while in a turbine pump they are generally adjacent the mid portion of said vanes.

17 Claims, 1 Drawing Sheet

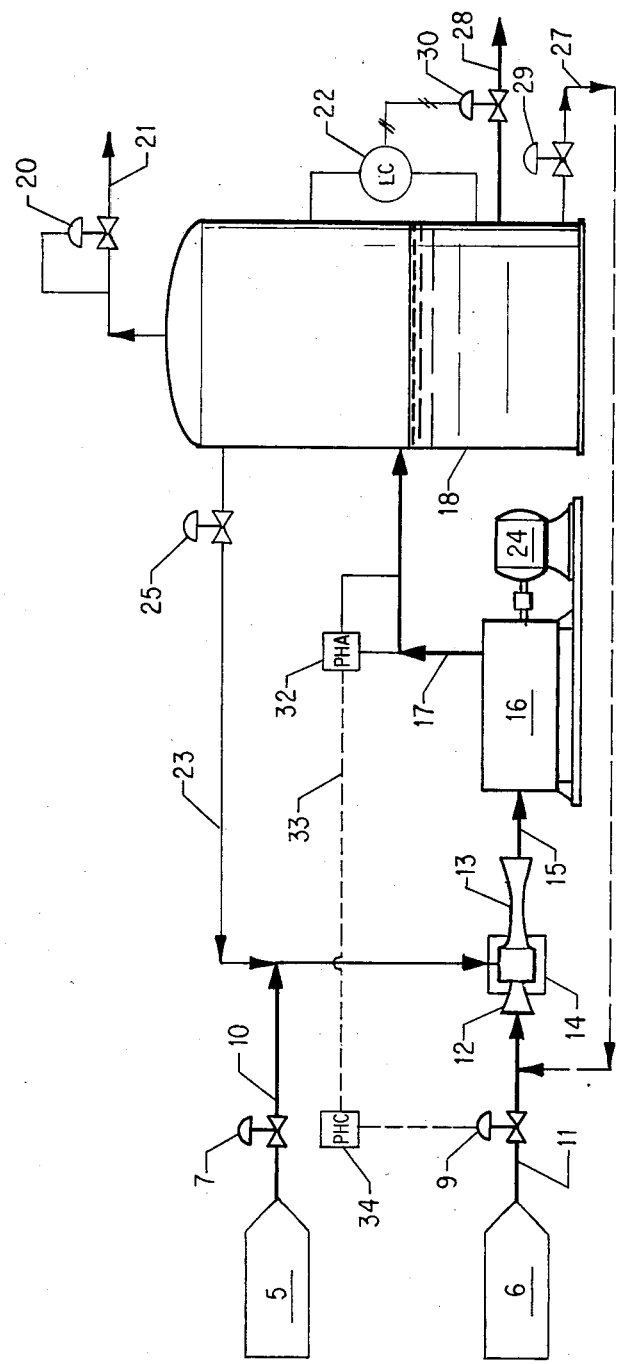

CONTINUOUS REACTION OF GASES WITH LIQUIDS

This invention relates to the art of continuously effecting chemical reactions between gases and liquids. More specifically, it is concerned with improved systems, apparatus and processes for the continuous manufacture of a fluid product from such a gas-liquid reaction. Indeed, the systems and apparatus of the present invention are especially suited for conducting a gas-liquid reaction in a steady state flow system to yield a desired gaseous or liquid product of consistent quality at a controlled rate e.g. to provide a chemical as needed for use in a continuous process. The preferred systems are those which produce a liquid product which is free of any significant amount of insoluble solid matter. Examples of some particularly suitable gas-liquid reactions include the following:

(1) chlorine gas with aqueous caustic solutions to obtain solutions of hypochlorous acid and/or hypochlorite salts;

(2) reacting an organic liquid with a gas such as HCl, $Cl_2$, $SO_3$, or $NO_2$ to yield a corresponding liquid organic derivative; and (3) reacting an aqueous solution of chlorite or chlorate material with gases such as $O_3$, $NO_2$, $Cl_2$, HCl or $SO_2$ to obtain chlorine dioxide as a gas or in solution.

BACKGROUND OF THE INVENTION

Systems and apparatus for continuously effecting gas-liquid reactions have traditionally favored countercurrent flow of the reactant streams of gas and liquid. Notable long standing examples of this dominant trend include the prevailing practice in operating equipment such as packed columns, bubble-tray columns, spray towers and the like.

A rare example of the continuous production of a fluid chemical reagent by reacting a gas with a liquid in a steady state cocurrent flow system is recorded in U.S. Pat. Nos. 2,889,199 and 2,965,443 of Osborne et al, wherein chlorine gas is reacted with an aqueous slurry of calcium hydroxide to produce a calcium hypochlorite bleach solution. However, the reactor employed in these patents consists of nothing more than an extended length or loop of ordinary piping (Reference numeral 16 in drawings). Other patents directed to gas-liquid mixing for purposes of treating said liquid also disclose cocurrent flow apparatus and systems such as U.S. Pat. No. 2,606,150 to Thorp and U.S. Pat. No. 3,997,631 of Matsuoka et al. These patents feature the use of liquid jet eductors or ejectors to mix ozone gas into the liquid being treated, e.g. water. Similar ejectors have also been employed in various systems and apparatuses for effecting gas-liquid reactions, e.g. in U.S. Pat. Nos. 4,483,826 (Louthan); 1,808,956 (Ketterer); 2,020,850 (Myhren et al); and 2,127,571 (Pardee, Jr.). However, U.S. Pat. Nos. 4,483,826 and 1,808,956 are directed only to batch or semi-batch operations, while the continuous reaction systems taught by U.S. Pat. Nos. 2,020,850 and 2,127,571 rely upon a counter current overall flow pattern between the gas and the liquid reactants in spite of the localized cocurrent flows which occur in the ejector units shown in said patents. Moreover, the apparatuses and systems of the latter two references are unduly complex, expensive and cumbersome to operate since they both involve a repetitive multiplicity of all the various pieces of equipment utilized therein, notably the ejectors, pumps, valves, separators, etc.

BRIEF SUMMARY OF THE INVENTION

The main objective of the invention is to provide simple means for continuously effecting chemical reaction between a reactant gas and a reactant liquid under controlled conditions to produce a gaseous or liquid product of consistent quality. The advantages and benefits incident to attaining this objective have special significance with regard to the economics and convenience of supplying such a product for use in an industrial manufacture or treatment when said product is difficult or expensive to ship or store. Another objective is to devise simple, compact, in-line cocurrent flow apparatus which imparts intensive agitation and turbulent gas-liquid intermixing thereby expediting the desired gas-liquid reaction and minimizing the residence time required. A further object is to provide a complete system for efficiently carrying out such gas-liquid reactions on a continuous basis with dependable and uniform results. Still other objects and advantages of this invention will be obvious from the detailed descriptions and specific embodiments thereof presented hereinafter.

The above objects and advantages are attained by conducting the desired gas-liquid reaction using a completely cocurrent, in-line flow system involving three major pieces of equipment connected in sequence in the following order:

(1) a fluid pressure energized, in-line, flow mixing device adapted to form an intimate gas-liquid mixture;

(2) an enclosed regenerative turbine pumping means equipped with one or more mechanically driven multivaned impellers and adjacent cooperating stator elements adapted to cause intensive turbulence and interaction in the gas-liquid mixture during its propulsion therethrough and simultaneously raise the pressure of said mixture by at least one atmosphere; and (3) an enclosed product receiver and gas/liquid separation tank equipped with pressure control means and liquid level control means effective to maintain a substantial gas head space therein.

Said tank (3) is preferably equipped with conduits from the gas head space and from the lower liquid space thereof connecting to gas and liquid feed lines leading respectively to said flow mixing device (1), thus permitting a portion of the gas and/or the liquid passed through said device to be made up of recycled material. Also, the specific type of in-line, flow mixing device (1) which has been found to be most suitable for initiating the desired gas-liquid reaction is a venturi jet mixer, while the regenerative turbine pumping means (2) found most efficient in expediting completion of the advanced stages of such reaction is a multi-stage turbine pump or liquid-ring compressor, the turbine pump being generally preferred unless the liquid stream is only a very minor fraction of the gas stream by volume.

Broadly stated then, the present invention expeditiously achieves a chemical reaction between a reactant gas and a reactant liquid to produce a fluid product on a continuous basis by a process which comprises the steps of:

(a) continuously feeding the reactant liquid and/or the reactant gas at pressures substantially above atmospheric to a fluid-energized, in-line cocurrent flow mixing zone to form an intimate gas/liquid reaction mixture and discharging said mixture from said zone at a pressure which is not substantially below atmospheric although lower than the feed pressure of at least one of said reactants;

(b) introducing the gas/liquid reaction mixture discharged in (a) to the upstream end of a mechanically operated, fluid propulsion zone in which at least one multivaned rotary impeller is driven adjacent to at least one side channel stator to effect intensive gas/liquid interaction and highly turbulent flow of said reaction mixture through said zone while simultaneously raising the pressure in said mixture by at least one atmosphere and discharging said mixture therefrom at an absolute pressure which is at least about two atmospheres; and (c) introducing the mixture discharged in (b) into an enclosed product receiving and gas-liquid separation zone maintained at absolute pressure of at least about two atmospheres and with a sizeable gas head space in the upper portion thereof.

Of course, with many gas-liquid reactions, it may prove desirable to recycle some of the separated gas and/or liquid from the gas/liquid separation zone of step (c) back to a primary stage in the overall process, such as the in-line cocurrent mixing zone of step (a). Thus, in addition to the potential for improving product yields and obtaining better utilization of reactants, the simplified recycle feature of the present system provides fine processing flexibility, e.g. the ability to adjust production rate while maintaining excellent quality control.

The close cooperation and crucial interdependence existing among the three major pieces of apparatus as integrated into the gas/liquid reaction system specified above can be better appreciated from the following concise analysis of the functions performed by each individually. Thus:

(1) The fluid pressure energized mixing device not only effects formation of an intimate gas-liquid mixture, but also feeds same to the regenerative turbine pump uniformly under at least about atmospheric pressure and preferably at superatmospheric pressure;

(2) The regenerative turbine pump equipped with multivaned impeller and cooperating side channel stator elements accepts the uniform feed of mixed and rapidly reacting gas and liquid smoothly and propels it efficiently therethrough while simultaneously increasing the pressure thereof by at least one atmosphere so as to discharge it at a pressure of at least about two atmospheres into the product receiving and gas/liquid separation tank; and (3) The product receiving and separation tank is equipped with liquid level controls and pressure control means permitting gas/liquid separation to occur therein under a pressure of at least about two atmospheres, thus simplifying delivery of a product in a continuing manner as well as the partial recycle of liquid and/or gas components to whatever extent it is desirable.

It will also be seen from the basic apparatus descriptions and concise functional analyses recited above that mixer (1) and pumping unit (2) are effectively serving as reactors in the present system, i.e. they actually provide the dominant zones or stages for accomplishing the desired gas-liquid reaction. Due to the compact nature of these two pieces of equipment and the high throughput volumes at which they operate effectively, the total residence time of the gas/liquid reaction mixture during its passage therethrough generally amounts to only very few seconds, i.e. typically about 1 to 5 seconds.

In spite of these limited residence times, excellent results have been obtained in terms of both reactant conversions and the yields and quality of desired product when conducting facile gas-liquid reactions in the present system and apparatus. For example conversions above 90% are often obtainable even without any recycling, probably because of the intensive gas-liquid interaction and highly turbulent yet uniform mixed-phase fluid flow achieved in the active reaction zones and equipment of the present system. Likewise, yields of the desired product based upon reactants converted is generally above 90% indicating little or no formation of unwanted by-products, (such as chlorites or chlorates instead of hypochlorites).

The present system and apparatus are most advantageous for operation with highly reactive gas-liquid pairs for which the thermodynamics are favorable even at ordinary temperatures. Of particular interest and suitability in the practice of the present invention are reactions between aqueous solutions of compounds (e.g. salts or hydroxides) and gases such as chlorine which produce useful liquid and/or gaseous reaction products. For example, chlorine gas can be reacted with caustic soda solutions to form sodium hypochlorite solutions useful in various disinfecting and bleaching treatments. Likewise, solutions of hypochlorous acid (HOCl) can be produced in similar manner by adjusting the proportions of caustic and chlorine reacted. Alternatively, HOCl solutions can be produced by reacting chlorine gas with solutions of carbonate or hypochlorite salts. In addition, gaseous product streams containing an active reagent such as chlorine dioxide could be obtained by reacting an aqueous chlorite salt solution with a reactive gas, such as $NO_2$ or $O_3$.

BRIEF DESCRIPTION OF THE DRAWING

The attached drawing is a simplified diagrammatic representation of a typical flow sheet of a continuous process for carrying out a gas-liquid reaction in accordance with the present invention. This flow sheet schematically depicts certain major items of apparatus and indicates how such apparatus can be combined and operated as a system for the sustained production of a steady supply of liquid reagent such as, e.g., a dilute aqueous solution of sodium hypochlorite bleaching agent via the continuous reaction of chlorine gas with dilute caustic solution.

DETAILED DESCRIPTION OF THE INVENTION

Referring now to the drawing, major items of equipment combined therein include venturi jet mixer 14, multi-stage regenerative turbine pump 16 and product receiving tank 18, which are connected in series by fluid handling conduits 15 and 17. The prime mover for pump 16 is electric motor 24 which is capable of driving the shaft on which the turbine impellers in pump 16 are mounted at speeds of at least about 1000 rpm. Tank 18 is equipped with pressure control valve 20 and vent 21 for maintaining the desired level of superatmospheric pressure therein and with liquid level regulator 22 to assure a substantial gas head space therein. Vent 21 leads to a scrubbing unit or other satisfactory cleaning device (not shown) for removal of noxious gas.

The liquid reactant, e.g. a dilute caustic solution, under suitable pressure is introduced axially to the venturi section 13 of jet mixer 14 through injector nozzle 12 via feed line 11, while the gaseous chlorine under lower pressure is supplied via feed line 10 to the plenum chamber in jet mixer 14 surrounding the entrance to venturi section 13. Because of the low boiling point of chlorine, it can also be fed as a cold liquid and allowed to flash vaporize just as it enters said plenum chamber. Feed lines 10 and 11, which connect respectively with chlorine source 5 and caustic solution source 6, are equipped with suitable regulating valves 7 and 9 for controlling the feed rates and pressure of the reactants.

After passing through venturi jet mixer 14 and turbine pump 16, the bulk of the chlorine has reacted to form hypochlorite and the residual reaction mixture is discharged via conduit 17 into product receiving tank 18, wherein unreacted gas (chlorine) collects in the upper region of said tank, while liquid product accumulates in the lower portion thereof. If automatic feedback control of the process is desired, a continuous monitor such as pH analyzer 32 can be placed in a bypass line from product delivery conduit 17. A signal from this analyzer 32 is then continuously transmitted to controller 34 having a preset pH reference point with which said signal is compared in order to effect corrective action via proportional adjustment of chlorine feed rate control valve 9. Such feed back control systems are ideally suited for use in the present system because of the exceptionally short residence times herein.

In order to allow for unreacted gas to be recycled back to the beginning of the process, a fluid handling conduit 23 containing a flow regulating valve 25 is provided between the gas head space of tank 18 and the gas feed line 10 into venturi jet mixer 14. In addition, for maximum flexibility, the portion of tank 18 below the gas head space thereof may be provided with the optional feature of liquid recycle line 27 leading back through regulating valve 29 to liquid feed line 11 of venturi jet mixer 14. Finally, tank 18 is also equipped (in the liquid holding section thereof) with discharge line 28 which delivers the liquid product from the system via regulating valve 30 as permitted by liquid level control imposed thereon by regulator 22.

As a result of the repressurization of the reaction mixture which is achieved in the regenerative turbine pump 16, it is very convenient to recycle residual material from the product receiving and gas/liquid separation tank 18 to the beginning of the process. Either gas or liquid recycle streams (or both) can be used to obtain optimum results with maximum flexibility of operation. Of course, the advantage to be realized in recycling gaseous reactant directly from the gas/liquid separation tank is usually greater when a liquid product is being manufactured, while direct liquid recycle generally merits priority consideration when the primary product is a gas.

In the case of reacting chlorine with a dilute aqueous solution of caustic soda to produce sodium hypochlorite bleach, the principal reaction involved proceeds as follows:

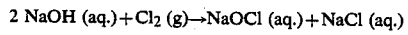

$$2\ NaOH\ (aq.) + Cl_2\ (g) \rightarrow NaOCl\ (aq.) + NaCl\ (aq.)$$

Stoichiometrically, this equation requires 1.13 lbs. of NaOH for each lb. of $Cl_2$ reacting, with 1.05 lbs. of NaOCl and 0.83 lbs. of NaCl being theoretically obtainable thereby. In practice, a small excess of NaOH over the stoichiometric is usually preferred since a high pH sodium hypochlorite solution results which has good stability, (e.g. a pH in the range of about 11 to 13 is generally obtained by using about 5 to 15% excess NaOH). Accordingly, in manufacturing sodium hypochlorite solution in accordance with this invention, the use of about 1.2 to 1.3 lbs. of NaOH per lb. of chlorine is recommended, which also promotes better utilization of the chlorine reactant.

It is also desirable that a liquid bleach containing less than about 10% by weight of NaOCl be produced in order to avoid the need for extraordinary heat removal procedures or equipment in the system. Thus, the heat of reaction released is sufficient to bring the temperature of liquid bleach product containing about 10% by weight NaOCl to the maximum desirable temperature (i.e. about 40° C.) even if the starting caustic soda solution is precooled substantially all the way to about 0° C. Accordingly, bleach solution containing between about 1 and about 6% NaOCl by wt. represent ideal products for manufacture in the present continuous generating system and fortunately are also generally in the range of primary interest in most industrial treatment processes.

While the preferred reaction temperatures for the present system are quite moderate and generally similar to ordinary climatic temperatures, the gas-liquid mixtures formed herein are maintained above atmospheric pressures for the most part. Thus, the initial motive fluid pressure supplied to the first stage in-line flow mixer 14 is generally at least two atmospheres absolute and sufficient to discharge the reaction mixture therefrom at not substantially less than atmospheric pressure, while the regenerative turbine pump 16 is adapted to increase the pressure of said reaction mixture by at least one full atmosphere. Preferably, said turbine pump will have the capability of repressuring the reaction mixture being discharged to the product receiving tank 18 to a pressure at least about as high as the initial motive fluid pressure supplied to mixer 14.

This use of such largely superatmospheric pressures appears to be a beneficial factor in promoting both uniformity and completeness of the desired reaction in the present system. In particular, the propulsion of the gas/liquid reaction mixture through the mixer 14 and pumping unit 16 becomes stabilized and remains quite smooth and steady under such largely superatmospheric conditions. It is also believed that mass transfer and overall reaction rates are generally increased through compression, e.g. as a result of increased solubility of gas in liquid and other similar effects. Accordingly; the preferred pressure for the initial motive fluid as well as the contents of product receiving tank 18 will be between about 40 and about 80 psia while the preferred pressure in the reaction mixture discharged from mixer 14 and fed to pump 16 is between about 20 and about 40 psia.

As indicated in the above description and discussion thereof, the schematic flow sheet in the attached drawing is presented in order to illustrate more concretely the operating principles of the present invention and to identify specific embodiments of satisfactory apparatus for successfully practicing same. In addition to those major alternatives already specifically pointed out, it will be obvious to those skilled in the art that many other minor variations and substitutions would likewise be viable.

Thus it is feasible for either or both of the main reactor units (e.g. jet mixer 14 and pump 16) to be operated in non-horizontal positions. For example, if pump 16 were equipped with a top entry inlet, it might be more advantageous to operate jet mixer vertically with an in-line conduit connecting to said pump inlet. Likewise, other mechanisms for applying automatic feed back control to the system may be employed instead of the pH analyzer 32 and cooperating controller 34. For example, similar instrumentation based upon measurement of another product property (such as the Redox potential) may be substituted in many cases, e.g. when producing solutions of hypochlorites, hypochlorous acid, etc.

The following specific operating example is included here in order to illustrate additional working details and considerations involved in successful practice of the present invention but said example should not be construed as implying any critical limitation on the useful scope of the invention.

EXAMPLE

This example describes the use of a system basically like that depicted in the accompanying drawing for the manufacture of an aqueous bleach solution containing about 2% by wt. of NaOCl.

Referring to said drawing, 100 gallons per minute of 0.6 molar NaOH solution (24 grams NaOH per liter) are supplied at a pressure of 40 psig via 2" pipe connection to nozzle 12 of venturi jet mixer 14, which is equipped otherwise with 3 inch pipe connections, while a total of 17.2 pounds of chlorine gas per minute is supplied at a pressure of about 10 psig to the plenum chamber in mixer 14 surrounding said nozzle 12. The resulting chlorine - caustic reaction mixture is discharged from the venturi mixer and passed through conduit 15 at about 15 psig to the inlet of a three stage, low NPSH turbine pump 16 having a turbine impeller in each stage and driven by a 20 H.P., 1800 rpm motor. Each turbine impeller has about 20 vanes and is closely-fitted between channel ring stator elements. (At least six vanes per impeller are needed for efficient operation and, depending upon rotor diameter somewhere between 10 and 30 vanes is preferable.)

The reaction mixture is discharged from pump 16 at about 50 psig and delivered to tank 18 having a capacity of over 200 gallons and equipped with a liquid level controller set to maintain the liquid/gas interface in between about 30 and 70% of the tank height and a pressure regulator set for about 45 to 50 psig.

The separate liquid and gas phases forming in said tank were evaluated to find that the liquid bleach solution obtained had a pH of almost 12 and a strength of about 1.97% NaOCl by weight, while unreacted chlorine accumulated therein at the rate of about 1 pound per minute. These figures indicate that about 94% of the chlorine fed had reacted and that the yield of NaOCl based on chlorine reacting was above 98%.

Thereafter, operations resumed in substantially the same system except that the fresh chlorine supply to mixer 14 is reduced by 0.9 lbs./min. to a rate of 16.3 lbs./min., while 0.9 lbs./min. of unreacted chlorine is recycled from tank 16 via conduit 23 and introduced to mixer 14 along with said fresh chlorine. Neither the liquid bleach product quality nor the collection rate of unreacted chlorine is affected by this modified operation, demonstrating the ease of recycling unreacted chlorine and obtaining effective utilization thereof in the present system.

Having described our invention including basic principles, illustrative embodiments and various useful modifications and variations thereof, we intend that the scope of the appended claims be limited only by their own explicit and definitive terms and not by gratuitous imposition or arbitrary inclusion of specific details or exemplary conditions described herein only for purposes of illustration.

We claim:

1. A compact assembly of apparatus for continuously effecting chemical reaction between cocurrently flowing gas and liquid reactants to form a desired fluid product comprising the following items of equipment connected closely in series in the order specified:
   (a) a pressurized, fluid energized, in-line cocurrent flow mixing device having separate inlets for gas and for liquid near an inlet end thereof plus means for continuously supplying gas and liquid respectively to said inlets and an outlet thereof for discharging the resulting gas/liquid mixture:
   (b) an enclosed, regenerative turbine pumping means having at least one mechanically drive multivaned impeller associated with close fitting stator elements, said pumping means being adapted to propel a gas/liquid mixture steadily through said pumping means to an outlet thereof while simultaneously increasing the pressure of the gas/liquid mixture by at least one atmosphere;
   (c) a fluid carrying conduit between the outlet of said flow mixing device and an inlet of said enclosed, regenerative turbine pumping means; and
   (d) an enclosed, super-atmospheric, pressure tight, product-receiving tank equipped with pressure control means and liquid level control means to maintain a desired super-atmospheric pressure and a substantial gas head space therein, an inlet opening located in a side wall of said tank and a fluid carrying conduit connecting said inlet opening with said outlet from the regenerative pumping means of (b), said tank also being equipped with fluid recycle conduits connecting a gas head space and a lower liquid holding space therein with the gas and liquid supply means for said cocurrent flow mixing device of (a).

2. A compact assembly of apparatus as in claim 1 wherein said regenerative turbine pumping means of (b) is a multistage unit having at least two stages equipped with multivaned impellers and having drive means adapted to rotate said impellers at speeds of over 1000 rpm.

3. An assembly of apparatus as in claim 1 or 7 wherein each impeller has at least 10 blades.

4. An assembly of apparatus as in claim 2 wherein said pumping means is a self-priming regenerative turbine pump.

5. A compact assembly of apparatus as in claim 1 wherein said means for continuously supplying liquid to the liquid inlet of the cocurrent flow mixing device of (a) is capable of supplying liquid at a pressure of at least about 40 psia.

6. A compact assembly of apparatus as in claim 5 wherein said mixing device comprises a venturi jet mixer.

7. A process for continuously producing a steady supply of dilute aqueous hypochlorite bleach solution of consistent quality by reacting chlorine gas with a dilute aqueous caustic solution, comprising:
   (a) continuously feeding chlorine gas and, in at least about stoichiometric proportions for the desired reaction with said chlorine gas, a dilute aqueous solution of caustic soda to the upstream end of a superatmospheric pressurized fluid energized, in-line, cocurrent flow mixing zone to form an intimate gas-liquid reaction mixture and discharging said mixture from the downstream end of said mixing zone at a pressure which is not substantially below atmospheric;

(b) introducing the reaction mixture discharged in (a) directly into the upstream end of a mechanically operated regenerative, fluid propulsion and repressurizing pumping zone in which at least one multivaned rotary impeller is driven adjacent to a side channel stator to effect intensive gas/liquid interaction and highly turbulent flow of said reaction mixture through said pumping zone while simultaneously raising the pressure in said mixture by at least one atmosphere and discharging said mixture therefrom at an absolute pressure which is at least two atmospheres;

(c) introducing the mixture discharged in (b) into an enclosed product receiving and gas-liquid separation zone maintained at an absolute pressure of at least about two atmospheres and with a sizeable gas head space reserved in a upper portion thereof;

(d) collecting the resulting liquid bleach solution as product in the lower part of said separation zone and unreacted chlorine gas in said head space; and (e) recycling some of at least one of the unreacted chlorine gas and liquid bleach solution collected in said separation zone in step (d) back to the upstream end of said cocurrent flow mixing zone of step (a).

8. A process as described in claim 7 wherein the concentration of said dilute aqueous solution of caustic soda and the proportions in which it is reacted with said chlorine gas are controlled to produce a liquid bleach solution containing between about 1 and about 6% by weight of sodium hypochlorite.

9. A process as in claim 7 wherein some of each of the unreacted chlorine gas and liquid bleach solution collected in the separation zone in (d) is recycled to the upstream end of said cocurrent flow mixing zone of (a).

10. A process as in claim 7 wherein steps (a) and (b) are preformed in only several seconds.

11. A process as in claim 7 wherein the pressure maintained in the separation zone described in step (c) is between about 40 and 80 psia and is not less than that of a superatmospheric pressurized fluid serving to energize the cocurrent flow mixing zone of step (a).

12. A continuous process for effecting chemical reaction between gaseous and liquid reactants comprising:
(a) continuously feeding said reactants into the upstream end of a fluid pressure energized, in-line, cocurrent flow mixing zone with at least one of said reactants being supplied at a pressure substantially above atmospheric pressure, thereby forming an intimate gas-liquid reaction mixture;
(b) discharging said gas-liquid reaction mixture from the downstream end of said mixing zone at a pressure which is lower than the pressure at which at least one of said reactants is supplied in (a) but not substantially below atmospheric pressure;
(c) transferring the reaction mixture discharged in (b) directly to the upstream end of a mechanically operated, regenerative, fluid propulsion and repressurizing pumping zone in which at least one multivaned rotary impeller is driven at high speed adjacent to a side channel stator to effect intensive gas/liquid interaction and highly turbulent flow of said reaction mixture through said pumping zone while simultaneously raising the pressure in said mixture by at least one atmosphere and discharging said mixture therefrom at an absolute pressure which is at least about two atmospheres;

(d) passing the thus pressurized mixture discharged in (c) into a superatmospheric, pressure tight, product receiving and gas/liquid separation zone maintained at a controlled pressure of at least about 1 atmosphere above atmospheric and equipped with liquid level control means adapted to reserve a sizeable gas head space therein while also maintaining a large liquid holding space in the lower region thereof;

(e) collecting the desired liquid product in a lower region of said gas-liquid separation zone while unreacted gases accumulate in said gas head space; and (f) recycling some of either or both of the gas collecting in said head space and the liquid accumulating in said lower region of said separation zone of (d) back to the upstream end of said cocurrent flow mixing zone of (a).

13. A process as in claim 12 wherein said liquid reactant is supplied in (a) at not less than about 40 psia and said zone in (d) is maintained at a controlled pressure higher than the pressure at which said liquid reactant is supplied in (a).

14. A process as in claim 12 or 13 wherein the gaseous reactant is chosen from the group consisting of $Cl_2$, $HCL$, $SO_3$, and $NO_2$ and the liquid reactant is an organic liquid.

15. A process as in claim 12 or 13 wherein the gaseous reactant is $Cl_2$ and the liquid reactant is an aqueous solution of a salt or a hydroxide of an alkali metal.

16. A continuous process for effecting a desired reaction between cocurrently flowing gas and liquid reactants to produce a desired liquid product which is substantially free of solid matter, comprising:
(a) continuously feeding said reactants in proportions providing a volumetric liquid to gas ratio of less than about one to the upstream end of a fluid pressure energized, in-line, cocurrent flow mixing zone, at least one of said reactants being introduced at superatmospheric pressure;
(b) discharging the resultant gas-liquid reaction mixture formed in (a) from the downstream end of said mixing zone at a pressure which is lower than the pressure at which at least one of the fluid reactants is supplied in (a) but not substantially below atmospheric pressure;
(c) transferring said reaction mixture discharged in (b) directly to the upstream end of a mechanically operated, regenerative, multistage fluid propulsion and repressurizing pumping zone in which at least one multivaned rotary impeller is driven at high speed adjacent to a side channel stator to effect intensive gas-liquid interaction and highly turbulent flow of said reaction mixture through said pumping zone while simultaneously raising the pressure in said mixture by at least one atmosphere and discharging said mixture therefrom at an absolute pressure which is at least about two atmospheres;
(d) passing the mixture discharged in (c) into an enclosed product receiving and gas-liquid separation zone maintained at an absolute pressure of at least about two atmospheres and with a sizeable gas head space reserved in an upper portion thereof;

(e) collecting the desired liquid product in a lower region of said gas-liquid separation zone while unreacted gases accumulate in said gas head space; and (f) recycling some of at least one of said liquid product and said unreacted gases from (e) back to the upstream end of said cocurrent flow mixing zone of (a).

17. A process as in claim 16 wherein the gaseous reactant is $Cl_2$ and the liquid reactant is a dilute aqueous solution of an alkali-metal hydroxide.

* * * * *